Jan. 15, 1924.
E. M. WILHITE
RULE
Filed Dec. 24, 1921
1,480,584
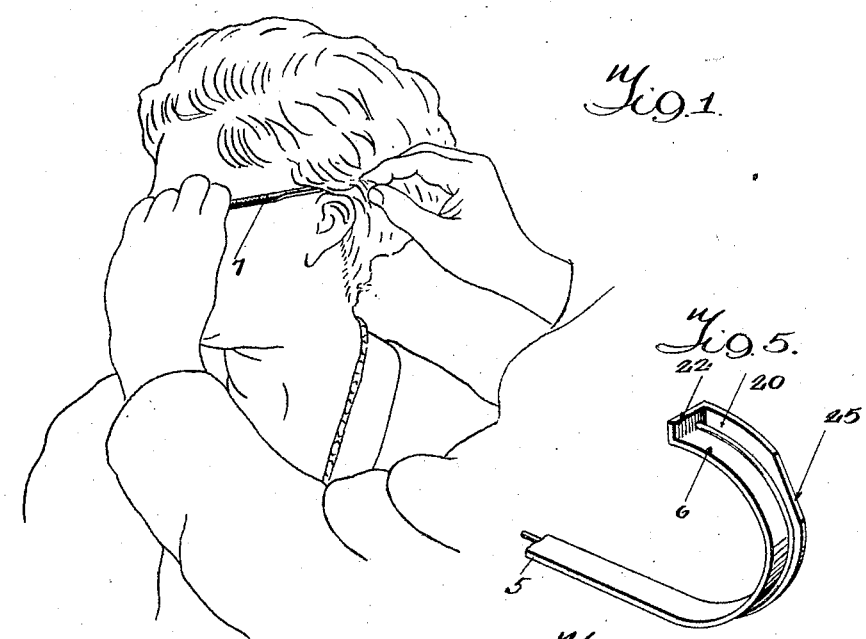
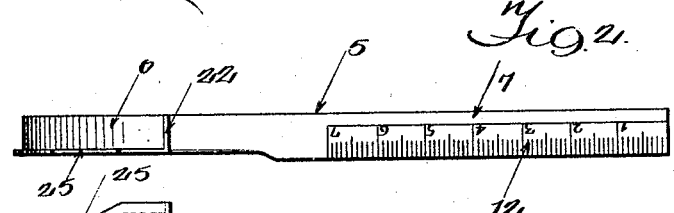
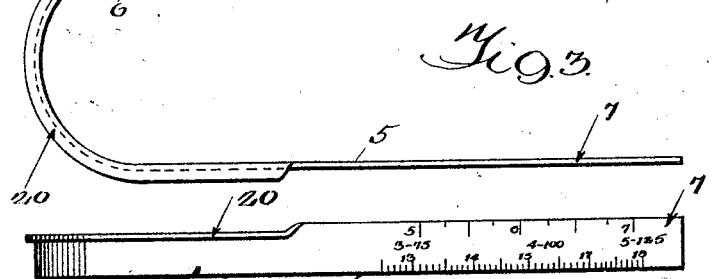

Patented Jan. 15, 1924.

1,480,584

UNITED STATES PATENT OFFICE.

EUGENE M. WILHITE, OF INDIANAPOLIS, INDIANA.

RULE.

Application filed December 24, 1921. Serial No. 524,595.

*To all whom it may concern:*

Be it known that I, EUGENE M. WILHITE, a citizen of the United States, and resident of Indianapolis, in the county of Marion and State of Indiana, have invented certain new and useful Improvements in Rules, of which the following is a specification.

This invention relates to rules especially adapted for use by opticians, optometrists and oculists.

An important object of this invention is to provide a rule having means whereby to measure the distance from the hinge point of a pair of spectacles to the farthest point behind the ear.

A further object is to provide a rule of the class described which has novel means to indicate the distance between the eye pupils and to indicate the distance between the centers of the two lenses.

Further the invention is provided with novel means to measure the bows, or temples of spectacles and to hold the bows securely in position when being measured.

A further object is to provide a rule of the character specified formed entirely from one piece of metal, which is simple to use and cheap to manufacture.

Other objects and advantages of the invention will be apparent during the course of the following description.

In the accompanying drawing forming a part of this application and in which like numerals are employed to designate like parts throughout the same, Figure 1 is a perspective illustrating the rule used to measure the distance between the hinged point of one of the bows and the farthest point behind one's ear.

Figure 2 is a plan view of the improved rule.

Figure 3 is a side elevation of the rule.

Figure 4 is a bottom plan view of the rule.

Figure 5 is a fragmentary perspective illustrating the curved end of the rule.

In the drawing wherein for the purpose of illustration is shown a preferred embodiment of the invention the numeral 5 generally designates the improved rule or measuring device which is formed from a single length of suitable material having one end bent to form an ear engaging portion 6 and a bow engaging member. The rule 5 is provided with what might be said to be a shank 7 extended forwardly from the curved portion 6 and provided on its upper side with calibrations according to the metric system and according to the English system so that when the curved portion 6 is engaged with one's ear in the manner illustrated in Fig. 1 the distance from the rearmost point of one's ear to the hinge point of the spectacles will be accurately indicated on the upper side of the scale. The optician merely looks down upon the upper side of the shank 7 and by observing the calibrations on the upper surface of the same he is accurately advised as to the distance from the rearmost point of one's ear to the hinge point of the spectacles.

As illustrated particularly in Figure 2 the under side of the shank 7 is provided with a series of calibrations 12 which are used when measuring the lenses of the spectacle or the distance between the centers of the lenses. The calibrations 12 on the under side of the shank 7 are also employed when it is desired to measure the distance between the pupils of one's eyes.

The improved rule may also be employed for measuring bows of spectacles either before the bows are connected to the spectacles or at any time thereafter. As clearly illustrated in Figure 5 one longitudinal edge of the curved portion 6 is provided with a flange 20 which constitutes a stop element to limit the lateral movement of the curved portion of the spectacle bow. The end of the curved portion is also provided with an upstanding flange 22 which constitutes a means to limit the endwise movement of the bows of the spectacles. By employing the flanges 20 and 22 the bow is accurately held in position for measuring purposes. In order that the curved portion of the spectacle bow might be securely held in position by the operator's finger I have provided the flange 20 with a flattened portion 25 (the edge of which is approximately flush with the surface of the spectacle bow). This permits one's fingers to be securely engaged with the curved portion of the spectacle bow.

The improved rule is also capable of a variety of other uses in connection with optical work and may be manufactured entirely from one piece of metal, thus the cost is very small. The flange 20 is of course provided by bending one longitudinal edge portion of the curved member 6 laterally. It will be seen that the flange 20 terminates slightly in advance of the curved part 6 at a point considerably in rear of the terminal portion of the shank 7.

The flanges 20 and 22 not only form a means to limit the movement of the bow but also greatly strengthen and reinforce the rule.

With reference to Figure 4 it will be noted that the calibrations on the edge portions of the rule indicate the total length of the bow, while the numbers on the rule between the longitudinal edges of the same indicate distance to the back of the ear. More specifically the numbers between the longitudinal edges of the rule indicate either in inches or millimeters the distance between the forward end of the temple and the extreme back of the ear. For example, the distance between the forward end of the temple and the back of the ear may be 4" or 100 millimeters or it may be 5" or 125 millimeters. It is thus seen that the two measurements are made simultaneously and with one application of the rule.

It might be stated that the temple piece may be readily and conveniently applied to the improved rule by a lateral movement of the temple piece onto the rule. That is to say the temple piece is applied to the outer side or surface of the rule and as the outer surface of the rule is comparatively flat and is entirely unobstructed at one side the temple piece may be quickly placed in position for measuring. This greatly facilitates the use of the device and renders the same extremely convenient and desirable.

Having thus described the invention what I claim is:—

1. A rule for use by opticians comprising a single length of material having one end portion curved whereby a temple piece may be flatly engaged with the outer surface of the same, said length of material being formed along one longitudinal edge with a flange constituting a means to limit the lateral movement of the temple piece, the curved end of said length of material being formed with a second flange limiting the endwise movement of the temple piece and cooperating with the first named flange in strengthening the rule.

2. The construction set forth in claim 1, one side of said rule being unobstructed whereby the temple piece may be applied to the rule by a lateral movement of the temple piece.

3. A rule for use by opticians comprising a single length of material having one end portion curved whereby a temple piece may be flatly engaged with the outer surface of the same, said length of material being formed along one longitudinal edge with a flange limiting the lateral movement of the temple piece, the other longitudinal edge of the length of material being entirely unobstructed.

EUGENE M. WILHITE.